(12) United States Patent
Manasse et al.

(10) Patent No.: US 7,716,250 B1
(45) Date of Patent: May 11, 2010

(54) ERASURE CODING AND GROUP COMPUTATIONS USING ROOTED BINARY AND TERNARY TREES

(75) Inventors: Mark Steven Manasse, San Francisco, CA (US); Alice Silverberg, Irvine, CA (US); Chandramohan A Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 11/139,914

(22) Filed: May 27, 2005

(51) Int. Cl.
*G06F 17/30* (2006.01)
(52) U.S. Cl. .................................................. 707/797
(58) Field of Classification Search ................... None
See application file for complete search history.

(56) References Cited

U.S. PATENT DOCUMENTS

| | | | | |
|---|---|---|---|---|
| 3,699,323 A | * | 10/1972 | Reinheimer | 708/531 |
| 4,412,285 A | * | 10/1983 | Neches et al. | 709/252 |
| 4,799,152 A | * | 1/1989 | Chuang et al. | 707/7 |
| 5,193,094 A | * | 3/1993 | Viterbi | 714/795 |
| 5,261,088 A | * | 11/1993 | Baird et al. | 707/206 |
| 5,343,554 A | * | 8/1994 | Koza et al. | 706/13 |
| 5,781,757 A | * | 7/1998 | Deshpande | 711/146 |
| 5,805,578 A | * | 9/1998 | Stirpe et al. | 370/255 |
| 5,930,392 A | * | 7/1999 | Ho | 382/224 |
| 5,974,411 A | * | 10/1999 | McCool et al. | 707/3 |
| 6,028,987 A | * | 2/2000 | Hirairi | 716/3 |
| 6,219,833 B1 | * | 4/2001 | Solomon et al. | 717/149 |
| 6,253,195 B1 | * | 6/2001 | Hudis et al. | 707/2 |
| 6,421,072 B1 | * | 7/2002 | Ku et al. | 715/804 |
| 6,697,365 B1 | * | 2/2004 | Messenger | 709/252 |
| 6,760,721 B1 | * | 7/2004 | Chasen et al. | 707/3 |
| 7,072,876 B1 | * | 7/2006 | Michael | 706/45 |
| 7,269,664 B2 | * | 9/2007 | Hutsch et al. | 709/246 |
| 2002/0023166 A1 | * | 2/2002 | Bar-Noy et al. | 709/231 |
| 2002/0172264 A1 | * | 11/2002 | Wiberg et al. | 375/147 |
| 2003/0044017 A1 | * | 3/2003 | Briscoe | 380/277 |
| 2003/0204508 A1 | * | 10/2003 | Cantu-Paz et al. | 707/100 |
| 2004/0103218 A1 | * | 5/2004 | Blumrich et al. | 709/249 |
| 2004/0220909 A1 | * | 11/2004 | Brown et al. | 707/3 |
| 2005/0050060 A1 | * | 3/2005 | Damm et al. | 707/100 |
| 2005/0198497 A1 | * | 9/2005 | Kocher | 713/158 |

(Continued)

FOREIGN PATENT DOCUMENTS

EP    1075108 A1 *  2/2001

(Continued)

OTHER PUBLICATIONS

Cormen et al., "Introduction to Algorithms", Dec. 2001, 2nd Ed., MIT Press, p. xiii, xiv, xv, 53-56.*

(Continued)

*Primary Examiner*—Khanh B Pham
(74) *Attorney, Agent, or Firm*—Woodcock Washburn LLP

(57) ABSTRACT

High throughput in data computations and processing is maintained while minimizing latency. A binary tree architecture is provided in which two trees are used simultaneously, and initiation of the trees is staggered to allow for optimal use of bandwidth. These techniques are desirable for erasure codes and other computations where the addition operator is commutative. Additionally, a ternary tree architecture may be used, in which three trees co-exist on the same set of nodes to maintain high throughput while further improving latency.

11 Claims, 9 Drawing Sheets

U.S. PATENT DOCUMENTS

| | | | | |
|---|---|---|---|---|
| 2006/0133680 | A1* | 6/2006 | Bossen | 382/240 |
| 2006/0221860 | A1* | 10/2006 | Manasse et al. | 370/254 |
| 2006/0230207 | A1* | 10/2006 | Finkler | 710/240 |

FOREIGN PATENT DOCUMENTS

| | | | |
|---|---|---|---|
| GB | 2378857 A | * | 2/2003 |
| WO | WO02082704 A1 | * | 10/2002 |

OTHER PUBLICATIONS

Knuth, "The Art of Computer Programming: Sorting and Searching", Jun. 2005, vol. 3, 2nd Ed., p. 303-310, 360-370.*

Taylor, "Survey and Taxonomy of Packet Classification Techniques", Sep. 2005, p. 238-275.*

Coulston, "Constructing Exact Octagonal Steiner Minimal Trees", Apr. 28, 2003, GLVLSI'03, ACM Press, p. 1-6.*

Gottlob et al, "The Complexity of Acyclic Conjunctive Queries", May 31, 2001, Journal of the ACM, ACM Press, p. 431-498.*

Farach-Colto et al, "On the Sorting-Complexity of Suffix Tree Construction", Journal of the ACM, Nov. 2001, p. 987-1011.*

Chin et al, "Fast Sorting Algorithms on Uniform Ladders (Multiple Shift-Register Loops)", Jul. 1980, IEEE Transactions on Computers, p. 618-631.*

M. Tull, W. Guoping, and M. Ozaydin, "High-Speed Complex Number Multiplier and Inner-Product Processor," in Proc 45th Midwest Symp. on Circuits and Systems, vol. 3, pp. 640-643, Aug. 2002, <Retrieved from internet Feb. 2, 2009>.*

L. Breebaart, "Rule-based compilation of data-parallel programs", Apr. 2003, Dissertation, Univ. of Amsterdam, 192 pages, <Retrieved from internet Feb. 2, 2009>.*

J. Diaz et al, "A Survey of Graph Layout Problems", Sep. 2002, ACM Computing Surveys, p. 313-356, <Retrieved from ACM Portal Sep. 17, 2008>.*

Brown, "It's the Law Too—the Laws of Logarithms", Mar. 2002, p. 1-8, <Retrieved from internet Jan. 26, 2009>.*

Z. Guo, "Embedding Binary X-Trees and Pyramids in Processor Arrays with Spanning Trees", Jun. 1994, IEEE Trans. on Parallel and Distributed Systems, vol. 5, No. 6, p. 664-672, <Retrieved from IEEE Explore Feb. 2, 2009>.*

M. Manasse, C. Thekkath, A. Silverberg, "A triple erasure Reed-Solomon code, and fast rebuilding", Jul. 8, 2004, Sixth Workshop on Distributed Data and Structures, <Retrieved from Isirwww.epfl.ch/wdas2004/Presentations/manasse.ppt Feb. 2, 2009>.*

W. Seow, B. Gupta, "On Designing a Reconfigurable Modular Fault-Tolerant Binary Tree Architecture", Apr. 1991, <Retrieved from Internet Sep. 29, 2008>.*

E. Lee, C. Thekkath, "Petal: Distributed Virtual Disks", Oct. 1996, ASPLOS, ACM SIGPLAN, p. 1-9.*

S.A. Browning, "The Tree Machine: A Highly Concurrent Computing Environment", Jan. 1980, Thesis, California Institute of Technology, Dept. of Computer Science, Technical Report 3760:80, p. i-viii,1-185.*

K.E. Batcher, "Sorting networks and their applications", Apr. 1968, Proceedings of the AFIPS Joint Computing Conference, p. 307-314.*

Manasse et al, "A Reed-Solomon Code for Disk Storage and Efficient Recovery Computations for Erasure-Coded Disk Storage", Jul. 28, 2005, WDAS, ZDNet, p. 1-11. <Retrieved from internet Feb. 2, 2009>.*

* cited by examiner

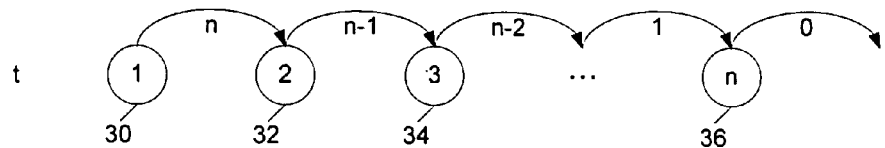
FIG. 1A - Prior Art
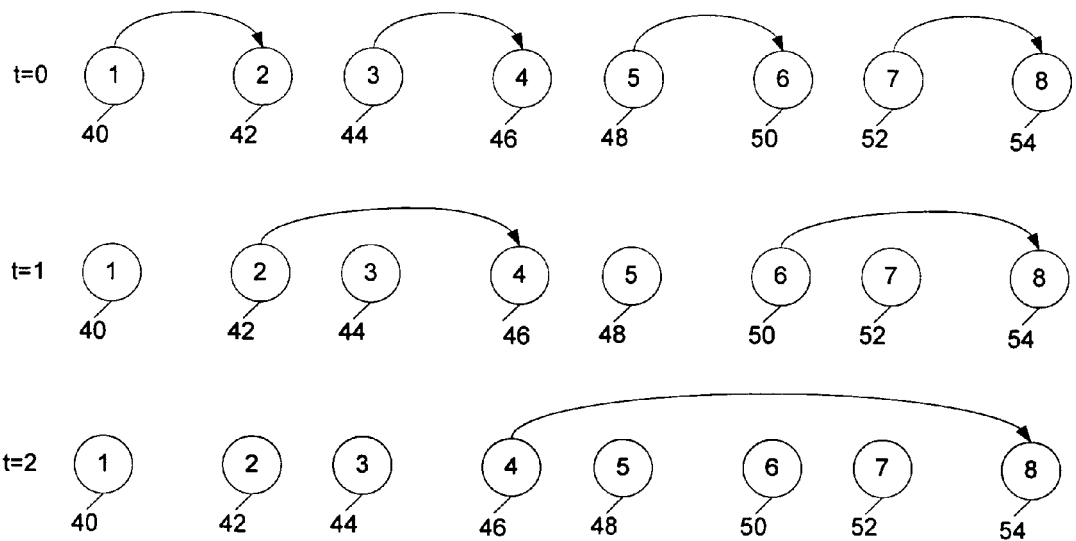
FIG. 1B - Prior Art

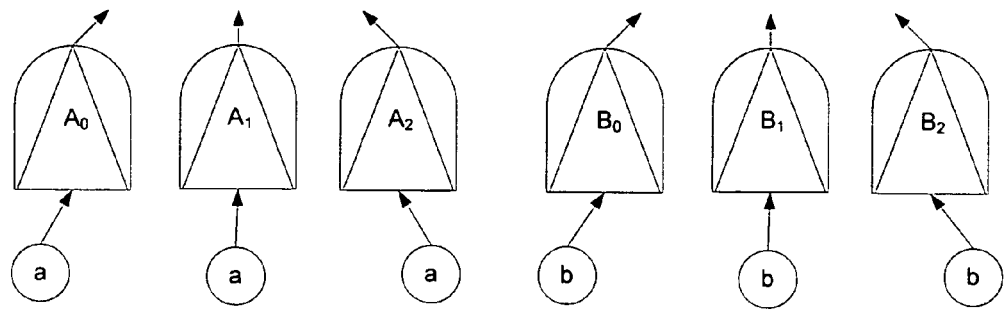
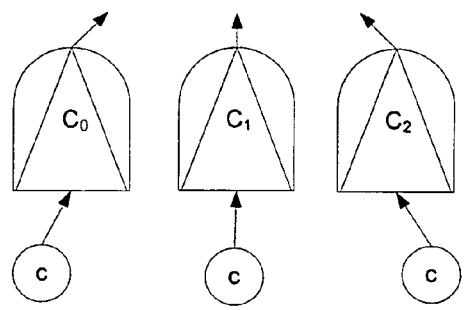
FIG. 5A
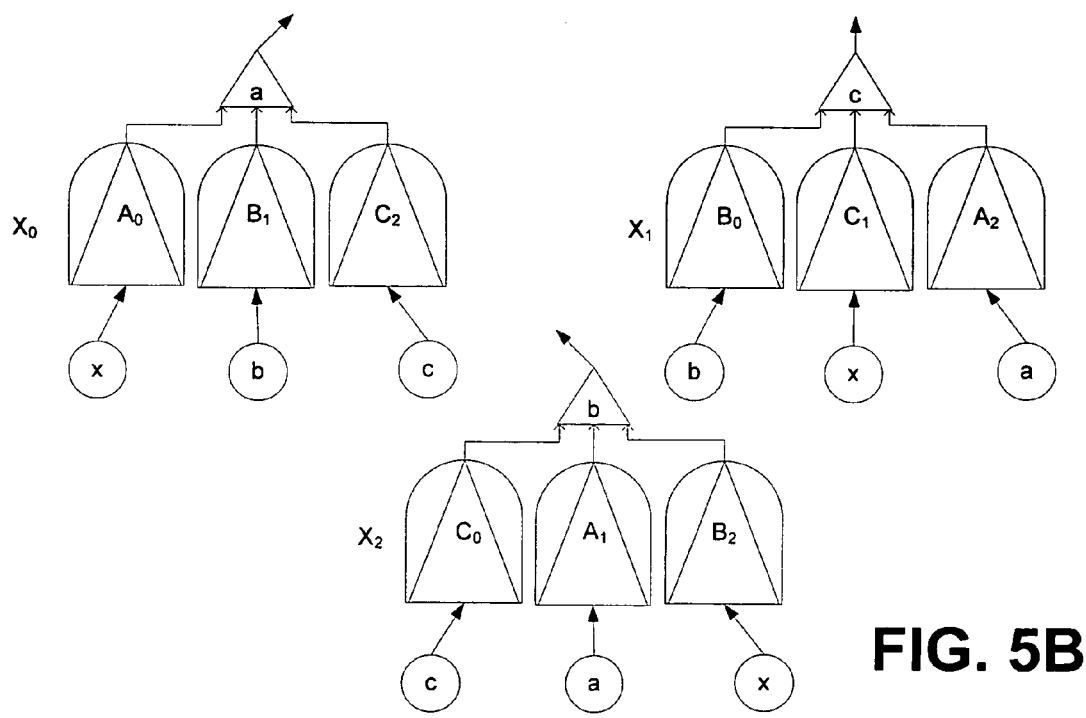
FIG. 5B

ERASURE CODING AND GROUP COMPUTATIONS USING ROOTED BINARY AND TERNARY TREES

FIELD OF THE INVENTION

The present invention relates generally to the field of computer systems and, more particularly, to providing erasure coding and group computations using binary and ternary trees to maintain high throughput while minimizing latency.

BACKGROUND OF THE INVENTION

Processing data over a network occurs in many contexts including data reconstruction, disaster recovery, storage, encryption, encoding, content serving, and others. A system's processor configuration may affect its data processing efficiency. Likewise, a processor's data communication techniques may also affect data processing efficiency. These effects may be particularly noticeable when reconstructing erroneous or lost data from a failed disk or storage system. For example, processor configuration may affect the throughput and latency characteristics associated with conventional communication techniques for processing data in networks.

When digital data is transmitted or stored, errors (when a data element is corrupted) and erasures (when a data element is missing or known to be faulty) may occur in the data stream. Erasure codes are used in many applications to efficiently protect and reconstruct data when stored or transmitted. Reed-Solomon based erasure codes have been used for many years because they are computationally convenient. Existing solutions are efficient when the number of drives is small. For larger drive systems, the latency of the system tends to be high, which is a problem when disk access is desired during the process of reconstruction.

FIG. 1A illustrates a conventional tree-based processor configuration (note that simple centralized star configurations are more common and slower). Generally, each processor may be represented by a node, and may be arranged in a network or pattern using a conventional topology representation. Here, a simple tree made up of processors, or nodes, 30-36 illustrates a nodal pattern for processing blocks n, n−1, n−2, . . . 1, and 0. Processors or nodes 30-36 perform data communication and processing functions on data blocks at a given time index in a serial fashion. Data blocks may be packets, frames, segments, or other data encapsulation formats having one or more associated values. Each block may also represent a portion of a data stream. In some embodiments, nodes 30-36 represent a "bucket brigade" processor or processing system. Each node receives a value associated with a data block and performs an action (e.g., computing a function) before sending an updated value or data block to the next node in the chain. A bucket brigade generally has good throughput, but a large latency, commensurate with the number of nodes.

FIG. 1B illustrates a conventional extended tree-based processor configuration. In some embodiments, the simple tree-based configuration of FIG. 1A is extended to a system of pairs of nodes (four pairs in the depicted instance) where each pair represents a parent and child node. Each node shown could be a node (an intermediate point in the tree) or a leaf (an endpoint) in the tree, and a root may be represented by a destination node, also known as a sink (not shown). Three sequential time indices, or steps, t=0, 1, and 2, during the processing of a data block, or value, are shown. At t=0, a data block is sent from odd nodes 40, 44, 48, and 52 (1, 3, 5, and 7) to even nodes 42, 46, 50, and 54 (2, 4, 6, and 8). Upon receipt by the even nodes, the value of the data blocks may be included in a computation before the next time index or step. At t=1, the data blocks are sent from nodes 42 and 50 to nodes 46 and 54, respectively. Again, a computation may be performed on the value of the data block, thereby changing the value of the data block, at the receiving nodes. At t=2, a data block is sent from node 46 to node 54, where a final data block value is accumulated. At the next time index or step, the data block having the final accumulated result is then sent to a destination node (not shown). In general, tree depth logarithmic in the number of nodes is required.

However, this configuration technique is inefficient because each node performs at most one task at a time (e.g., sending, receiving, storing/accumulating, performing a computation, or others), and many nodes have no tasks during most of the steps. Further, low throughput is achieved (long periods of time are required to begin processing of the next elements of a data stream, because a few nodes are repeatedly busy). Still, in this configuration, latency is also low, a computation completes quickly once started.

As a result, conventional nodal patterns configured using conventional techniques suffer from processing delays and/or latencies, slowing tasks such as responding to requests for data, encoding, encryption, data reconstruction, catastrophe recovery, and the like. Further, conventional configuration techniques often require the implementation of expensive and complex hardware and software to compensate for increased latency.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The present invention is directed to maintaining a high throughput while minimizing latency. A binary tree architecture is provided in which two trees are used simultaneously, and initiation of the trees is staggered to allow for optimal use of bandwidth. These techniques are desirable for erasure codes and other computations where the addition operator is commutative.

Aspects of the present invention are to directed to techniques for constructing a ternary tree architecture, in which three trees co-exist on the same set of nodes to maintain high throughput while further improving latency.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 1A illustrates a conventional tree-based nodal pattern;

FIG. 1B illustrates a conventional extended tree-based nodal pattern;

FIG. 5A illustrates exemplary ternary trees useful in describing aspects of the present invention;

FIG. 5B illustrates additional exemplary ternary trees useful in describing aspects of the present invention;

DETAILED DESCRIPTION OF ILLUSTRATIVE EMBODIMENTS

Figure 2A:
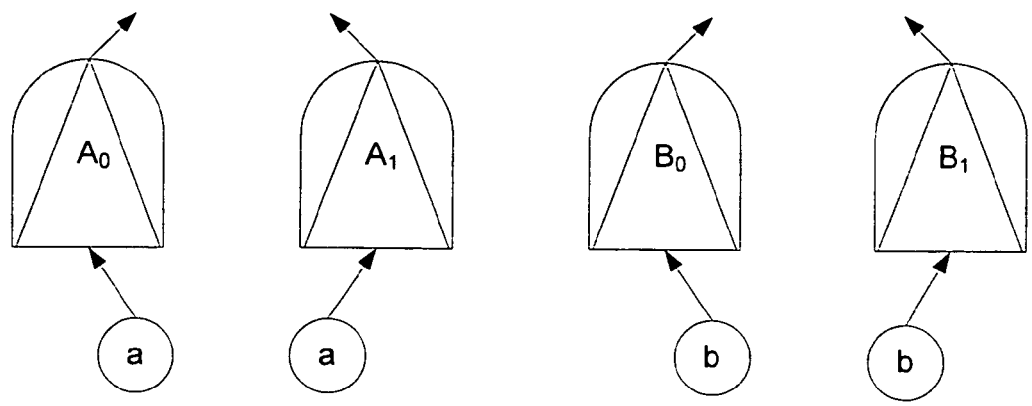
FIG. 2A illustrates exemplary binary trees useful in describing aspects of the present invention.

Implementation of described techniques may occur in numerous ways, including as a process, an apparatus, a system, a composition of matter, a computer readable medium such as a computer readable storage medium, or a computer network wherein program instructions are sent over optical or electronic communication links.

A detailed description of one or more embodiments is provided along with accompanying figures that illustrate the principles of the embodiments. The scope of the embodiments is limited only by the claims and encompasses numerous alternatives, modifications, and equivalents. Numerous specific details are set forth in the following description. These details are provided solely for the purpose of example and the embodiments may be practiced according to the claims without some or all of these specific details.

Techniques for nodal pattern configuration are described and may be implemented to achieve reduced latency and increased throughput in data communication by configuring nodes to perform disparate concurrent actions. Individual nodal configurations may also be referred to herein as "nodal patterns" and may also be composed of nodal sub-patterns. Within each nodal pattern or sub-pattern, a nodal path may be defined for a data block ("block"), series of data blocks, segment, or frame of data being processed through a particular nodal pattern or sub-pattern. As used herein, nodes may describe processors, processing systems, communication systems, or other discrete data communication implementations. A nodal pattern configuration may be referred to as a nodal pattern, communication system configuration, communication pattern, processor pattern, processor configuration, or the like. A nodal pattern configuration may also describe an arrangement or configuration of nodes (including a source, destination, and one or more intermediate nodes) for performing actions (e.g., receiving, sending, performing a computing function, storing or accumulating a data block or series of data blocks, and the like) at a given time index or step in a particular manner or sequence. Intermediate nodes (i.e., nodes other than a source or destination node) may be configured such that each intermediate node may concurrently perform at least two actions.

The described techniques enable processing of an action, algorithm, task, or function. The described nodal pattern configurations and configuration techniques may also be used in other contexts beyond communication processor configuration. Some embodiments include weather pattern analysis, air traffic control, network computing, and the like.

The efficient computation of encodings and decodings of erasure codes are desirable when considering large storage arrays. In a practical erasure code setting, efficiently computing streams of parallel sums is the core computation at the bottom of reconstructing a failed disk, using exclusive-or (XOR) as the addition operator. Thus, it is desirable to XOR data items as quickly as possible (high throughput), and have low latency. A XOR B means "A or B, but not both"; this is typically computed bit-wise for data items consisting of 8, 16, or 32 bits.

The techniques of the present invention are optimal in throughput, and near-optimal in latency in reconstructing data blocks from a failed disk. Throughput is important in that timely reconstruction is desirable to guaranteeing that failures are promptly repaired. The faster reconstruction can take place, the lower the likelihood of suffering a concurrent failure for the same data items, and so the more likely that data items will survive. Low latency is important in that client requests to read or write not-yet-reconstructed blocks desirably receive timely responses. The techniques in accordance with the present invention are much simpler than conventional schemes for achieving optimal throughput and optimal latency, yet have latency at most double that of an optimal scheme. These techniques work for erasure codes and other computations where the addition operator is commutative. The commutative property holds for the operation XOR: A XOR B=B XOR A. Some aspects of the present invention are applicable more generally to other associative binary operators, while others apply only to commutative and associative operators. In particular, if only a single tree is built instead of two or three trees, an arbitrary associative operation can be chosen, at the cost of a decrease in throughput by a factor of two or three.

In accordance with the present invention, a tree, such as a binary tree or ternary tree, is built, and then corrected by reducing its number of nodes. The use of a commutative operator allows for re-ordering during building of the trees. The latency and throughput are thus improved. A recursive construction technique is used.

An example computational environment comprises a set of data sources $D_j$ that contains data values $d_{ji}$. A single data sink $D_\infty$ (the target) is also provided. Processing elements $P_j$ can compute '+', and read values only from the corresponding $D_j$ ($P_\infty$ is able to write $D_\infty$). A network synchronously allows each processing element to receive at most one, and transmit at most one data value. The processing elements can simultaneously read one value and perform one addition/XOR.

This model is close to what can be achieved by connecting processors to small Ethernet switches, with high-speed uplinks to a fast switch. Disks are only a small multiple faster than 100 megabit networks. By replicating the network two or three times, rough parity can be attained, as well as having better fault-tolerance.

Constructing a two-level network with a high-performance switch above slower ones allows for the appearance of arbitrary independent pairs that communicate concurrently, as long as much of the communication never leaves a slower switch. For example, 12 port gigabit switches may be used as fast switches, and 24 port 100 megabit switches with two gigabit uplinks may be used as slow switches. Such a network supports arbitrary communication patterns in which at most eight values in each direction transit any gigabit link concurrently.

If only throughput was to be considered, then a bucket brigade may be used. For example, a first processor reads blocks and forwards them to a second processor which adds the received value to the corresponding data value and forwards the result to a third processor which adds the received value to the corresponding data value and forwards the result to a fourth processor, etc. If the processors are arranged so that most consecutive processors are on the same small switch, the inbound and outbound cross-switch traffic can be limited to one slow link in each direction. Doing so (depending on how the wiring is arranged) may require processors to be arranged in ways where consecutive does not correspond to consecutive in the sum, which requires dependency on commutativity of addition; if the processors naturally come in the right order, even associativity is not needed.

This organization of the computation has high throughput, but also high latency. With n summands, the first result appears after n packets have been passed down the chain. On the other hand, a finished result is computed on every packet transmission to the last node thereafter, and packet transmissions can be overlapped, so the pipeline has optimal throughput, computing results at the speed of the slowest input. For simplicity of exposition, assume that network and processing speeds are all identical; in practice, the system will desirably scale down to the slower of these.

The latency is of little concern when complete disks are being reconstructed because the time to read or write a complete disk is many orders of magnitude larger than the latency of sending a few hundreds of network packets. If a disk array were removed from ordinary service during reconstruction, this would be adequate. If, however, it is desired that the disk array satisfy read or write requests while operating in degraded mode, this latency may be unacceptable.

Previous work has taught how to achieve throughput and latency with a complex recursive construction. In that case, in-place binary trees were considered. To achieve lower latency, associativity was exploited. Noting that $a+b+c+d=(a+b)+(c+d)$, an in-place binary tree was constructed which can compute a sum in $\log_2 n$ rounds of communication, which is optimal. Such a network is constructed by sending from $P_{2i+1}$ to $P_{2i}$ in the first round, $P_{4i+2}$ to $P_{4i}$ in the second round, $P_{8i+4}$ to $P_{8i}$ in the third round, and so on, up to $P_{2^{\lceil \log_2 n \rceil - 1}}$ to $P_0$, summing the values as received (and omitting any communications where the subscript is n or larger). The difficulty with this construction is now that the throughput is reduced by a factor of $\log_2 n$.

These two techniques can be combined, using the bucket brigade for batch reconstruction, and switching to the tree-based approach for demand reconstruction, and this may be adequate for many practical situations. However, the network is being underutilized in the tree approach, and it is desirable to improve. One improvement is to overlay a second tree sending from $2_i$ to $2_{i+1}$, $4_{i+2}$ to $4_{i+3}$, etc. and add one extra unit of latency and some buffering to perform an extra disk read before starting the communication. This improves the throughput by a factor of two.

Approximately $\log_2 n$ non-interfering trees would be used to raise the throughput to match the bucket brigade. Even if more latency and buffering is added, in the first step of an in-place binary tree, half of the nodes are sending and half of the nodes are receiving. This does not improve on a factor of 2 if all of the trees are started at the same time. Instead, the initiation of the trees may be staggered, so that while half the available communications bandwidth is being used for the leaves of the tree, a quarter for the next level is being used on the previous block, an eighth for the level above that on the block started two cycles ago, etc. Such a method has been described in previous work. Different (and simpler) techniques are described herein, achieving the same throughput but slightly increased latency.

Figure 2B:
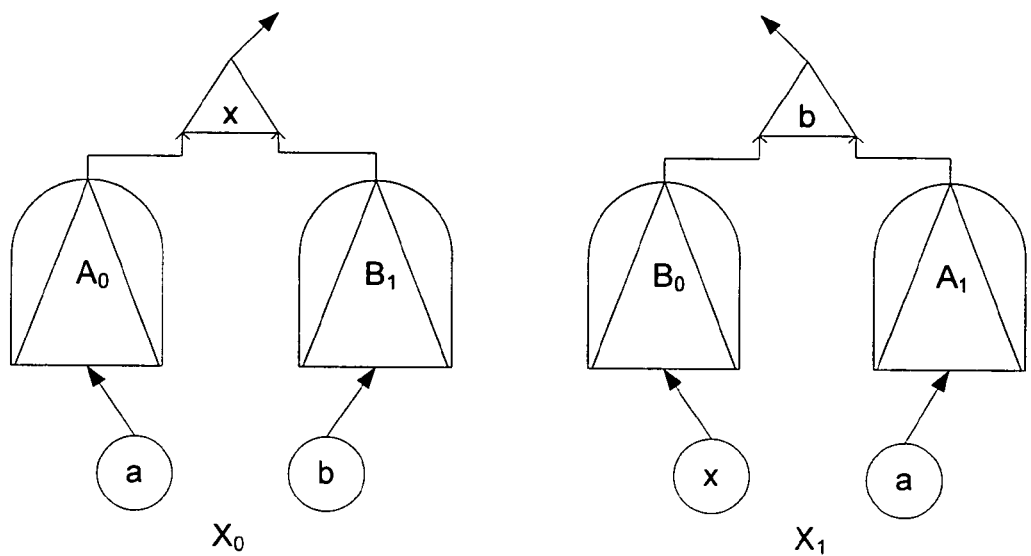
FIG. 2B illustrates additional exemplary binary trees useful in describing aspects of the present invention.

FIGS. 2A and 2B illustrate exemplary trees useful in describing aspects of the present invention. FIG. 2A shows four trees $A_0$, $A_1$, $B_0$, and $B_1$, where 0 and 1 relate to the step number. Arrows leaving nodes or trees point to the right or left in accordance with whether the communication step occurs in even-numbered steps or odd-numbered steps. The nodes comprising trees $A_0$ and $A_1$ are identical, as are those of trees $B_0$ and $B_1$, with most nodes occurring once as an internal node, and once as a leaf. The nodes in $A_0$ and $A_1$ are disjoint from those in $B_0$ and $B_1$. $A_0$ and $A_1$ each have a node a, and $B_0$ and $B_1$ each have a node b, where these nodes are special among all the nodes in the trees such that a and b serve only as leaf nodes. No node is a parent node in both $A_0$ and $A_1$ or $B_0$ and $B_1$. No node is a left-child in both $A_0$ and $A_1$ or both $B_0$ and $B_1$ nor a right child in both. $A_0$ and $B_0$ each produce output going to the right (e.g., going to the right in a tree or nodal pattern), and $A_1$ and $B_1$ each produce output going to the left. In accordance with the present invention, the trees $A_0$, $A_1$, $B_0$, and $B_1$ are combined, and parent nodes are added.

More particularly, as shown in FIG. 2B, $A_0$ and $B_1$ are combined as subtrees to a parent node x, and $B_0$ and $A_1$ are combined as subtrees to a parent node b (the special node of $B_0$ and $B_1$). The $A_0/B_1$ tree may be referred to as binary tree $X_0$ and the $B_0/A_1$ tree may be referred to as binary tree $X_1$; the special node for the new trees is node a. Thus, two trees (e.g., $B_0$ and $A_1$) are overlaid to form a new tree ($X_1$). The latency increases by two steps, and the tree has increased in size from n to 2n+1. The throughput remains the same (at unity). A further description of an example process is provided herein with respect to FIG. 8.

Moreover, with respect to FIGS. 2A and 2B, a communication pattern on even and then odd steps is shown. Suppose that it is known how to build tree-pairs up to a certain size. Build two such tree-pairs, A and B; $A_0$ denotes the tree in the A-pair which sends from the root node on even steps. In the tree-pairs A and B, there is a node which is a leaf in both trees (lowercase letters are used to indicate the leaf node, so node a is a leaf in both $A_0$ and $A_1$, and b is a leaf in both $B_0$ and $B_1$). To combine these trees into tree-pair X, add a new node x. In $X_0$, put x at the root, and make $A_0$ and $B_1$ children. To create $X_1$, elevate b to the root, with children $B_0[b/x]$ ($B_0$ with b replaced by x) and $A_1$. Note that the permanent leaf in X is node a, not node x. Other permutations also work; to make x be the leaf, for instance, put b at the root of $X_0$, with children $A_0[a/x]$ and $B_1[b/a]$, and a at the root of $X_1$, with children $B_0$ and $A_1[a/x]$; note that the pendancy of a is reversed in both trees from that in A.

In an example embodiment, XOR is the operation performed at each parent node. The addition of an extra parent node (x or b, for example) adds two steps of latency, one waiting for the result from the left, one for the right value. When both values have been received, the XOR of those values together with the value locally resident in the node is computed, and transmitted on the next step with appropriate pendancy.

This can be improved upon with a $3 \log_3 n$ solution. A three phase tree can be generated, as described with respect to FIGS. 5A and 5B.

Figure 3A:
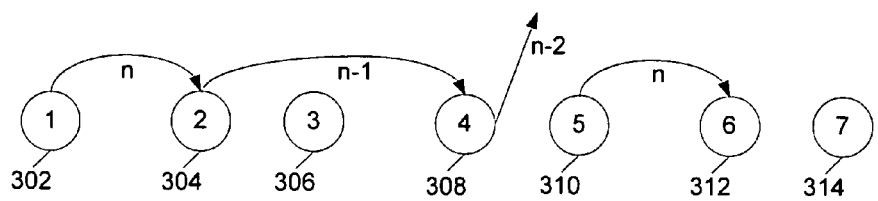
FIGS. 3A and 3B illustrate exemplary simple rooted binary tree nodal patterns in accordance with the present invention.
Figure 3B:
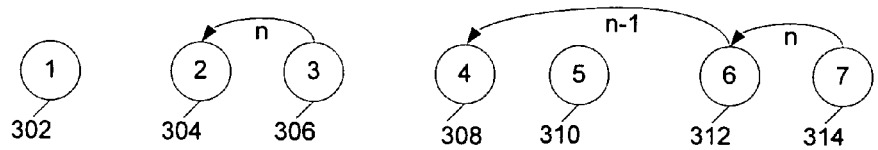

FIGS. 3A and 3B illustrate an alternative representation of exemplary simple rooted binary tree nodal patterns in accordance with the present invention. FIGS. 3A and 3B correspond to a tree $A_0$ of FIG. 2A, for example, with FIG. 3A showing the even step communications and FIG. 3B showing the odd step communications.

Figure 4A:
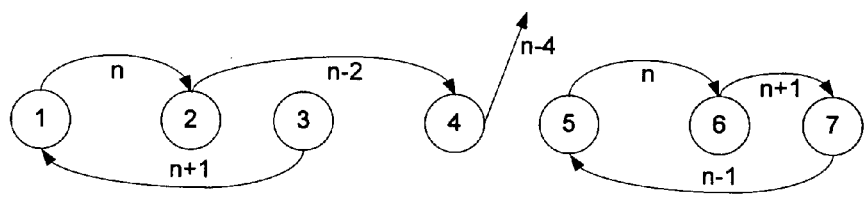
FIGS. 4A and 4B illustrate additional binary tree nodal patterns in accordance with the present invention.
Figure 4B:
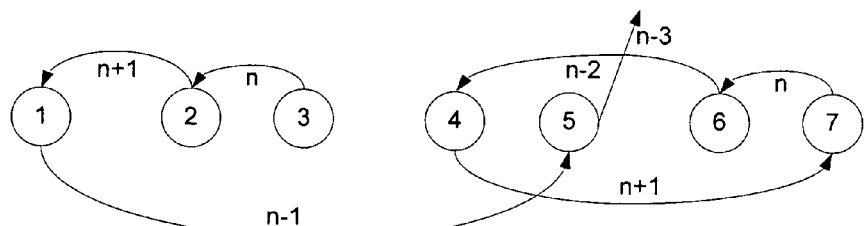

FIGS. 4A and 4B augment FIGS. 3A and 3B by additionally illustrating the links in tree $A_1$, for example, for a specific binary tree nodal pattern in accordance with the present invention as previously depicted in FIG. 2A.

The embodiments shown in FIGS. 3A and 3B and FIGS. 4A and 4B illustrate sub-patterns within a nodal pattern, which may be described in terms of nodes 302-314, where node 306 is a source node, nodes 302-314 excluding 306 are intermediate nodes, with nodes 308 and 310 serving as roots of the trees, and a destination node is not shown. In general, nodes may perform different actions on a series of data blocks, which may be labeled using data block indices or steps (e.g., "n," "n−1," "n−2," "n+1," etc.), generating a series of processed data blocks. In some embodiments, block indices may also be used to describe independent values associated with a given data block. In other embodiments, block indices may be used to indicate the position of values within a nodal sub-pattern or pattern at a given time index or step. A data stream may be composed of one or more data blocks, segments, frames, or the like. The described configuration techniques may include the aspect of performing various types of computations (e.g., commutative, associative, and the like).

In some embodiments, a nodal pattern may be broken into nodal sub-patterns, which describe a given system's nodal configuration. In turn, a nodal pattern may be used to describe a processor configuration, with various nodal paths (i.e., a particular route that a data block may take through a given nodal pattern or sub-pattern) for routing blocks.

Thus, FIG. 3A is showing a different view of one of the two trees in a tree pair, splitting out the left-right distinction into the figures for even and odd step communication. Having just a single tree means that the latency is still good, but the throughput is halved; on the other hand, it can be independent of the commutativity of the combining operation, depending only on associativity. When FIGS. 3A and 3B are viewed together, note that odd-numbered nodes (in the original numbering) are leaves, and even ones are internal. When viewing the patterns in FIGS. 4A and 4B instead, almost every node serves as both source and destination, with only node 3 being only as a source node. In each of FIGS. 4A and 4B, no node receives more than one item at a time, or sends more than one item at a time.

A nodal pattern may be used to concurrently process different data blocks. For example, referring to FIGS. 4A and 4B, the nodal sub-pattern may concurrently process data blocks n−2, n−1, n, and n+1 by operating on and communicating (or sending) data blocks previously stored at the different intermediate nodes, while at the same time receiving data blocks at each intermediate node. By using concurrent processing, the sub-pattern allows each intermediate node to both send and receive at any given time index (or step). An intermediate node may output a data block to a destination node on every step, thereby eliminating the time associated with filling additional nodes, or creating additional latency.

In some embodiments, the processor-configuration is a tree-based nodal pattern that may be modified to provide communication where each node is configured to perform more than one action at a given time index (or step) t. In other embodiments, nodal patterns (or sub-patterns) may be based on different data structures (e.g., rooted binary tree, ternary tree, and the like), expanded, repeated, or contracted using more or fewer nodes or different schedules. In some embodiments, a schedule may be used to describe the nodal path of a data block (e.g., n, n−1, n−2, n+1, n+2, etc.) prior to reaching a destination node. A schedule may also be used to describe patterns or sub-patterns at each time index or step, as well as values assigned to each data block and the various nodal paths that data blocks traverse to reach a particular destination node. Schedules may be tailored for particular tree-based nodal patterns, such as those described herein. Schedules may also be used to determine how many data blocks are to be processed, and the order of processing within a nodal pattern, sub-pattern, or nodal path, prior to sending a data block from a particular node in a sub-pattern to a destination node.

Assume a binary tree where nodes are either leaves or internal. A tree in accordance with the present invention can be built in which the latency is a factor of 2 worse and the throughput is a factor of 2 worse than optimal. Suppose nodes 1, 3, 5, ... are leaves, and 2, 4, 6, ... are internal. In an in-order traversal, nodes 1 and 3 would be the left and right children of node 2; 5 and 7 would be children of 6, and 2 and 6 children of 4. The average of the children nodes is the parent. Numerically, $2^k(4s+1)$ is the left child, and $2^k(4s+3)$ is the right child of parent node $2^k(4s+2)$ for nodes at level k, measured from the leaves. A level k node sends block i to its parent on step 2i+2k if a left child, and 2i+2k+1 if a right child. See FIGS. 4A and 4B for illustrations of this tree.

Building just this tree, it takes two steps to reduce the number of nodes holding a block by one-half, and a block is completed only every other step (when the root node has received input from both children).

Note now that half the nodes (plus one) are leaves, and thus receive nothing and transmit only half of the time. The other half of the nodes are parents, and thus receive on every step, and transmit every other step. If leaves could be converted into parents, and parents into leaves, all the unused capacity of all nodes could be used except for the one leaf node that desirably stays a leaf node which never receives anything.

FIG. 5A illustrates exemplary trees, and FIG. 5B shows resultant ternary trees after processing the trees of FIG. 5A in accordance with the present invention. Given three families A, B, and C, a tree family is constructed containing all of them. Note that a, b, and c are permanent leaves in A, B, and C, and that x (a new node) is a permanent leaf in the resulting family.

Consider ternary trees (trees with three children), and graphically represent tree triples (e.g., FIGS. 5A and 5B), using pendancy to indicate transmission on steps 0 mod 3, 1 mod 3, and 2 mod 3. In this case, note that combining three tree-triples and adding one node provides enough communication bandwidth to support a larger tree-triple. The permanent leaf node in each triple has pendancy matching the pendancy of the entire tree; in this case, given $A_i$, $B_i$, and $C_i$ with leaves a, b, and c, build $X_i$ by introducing a new permanent leaf node x, which will cyclically replace a, b, or c. Take $X_0$ to have root a, 0'th child $A_0$[a/x], 1'st child $B_1$, and 2'nd child $C_2$. $X_1$ has root c, 0'th child $B_0$, 1'st child $C_1$[c/x], and 2'nd child $A_2$. $X_2$ has root b, 0'th child $C_0$, 1'st child $A_1$, and 2'nd child $B_2$[b/x]. Other permutations are also possible. The resulting trees have $(3^k-1)/2$ nodes.

Figure 6A:
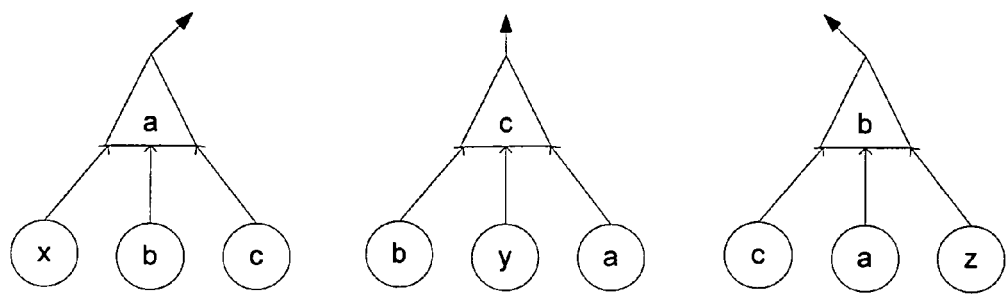
FIGS. 6A-6C illustrate exemplary trees useful in describing aspects of the present invention.
Figure 6B:
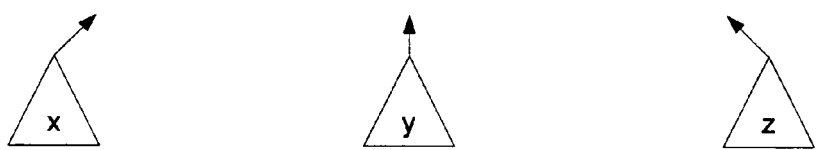
Figure 6C:
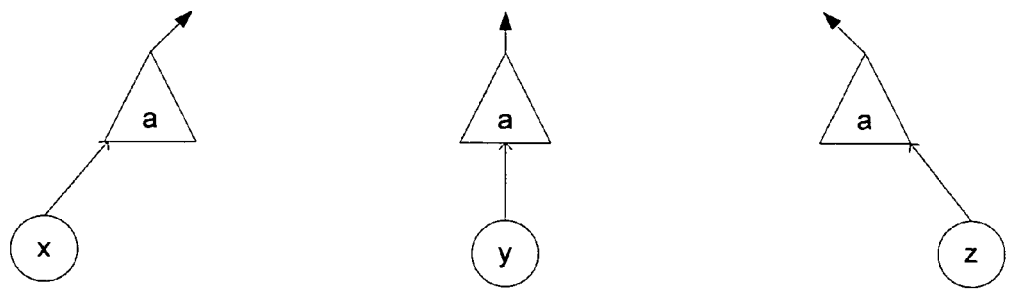

FIGS. 6A-6C relate to shrinking ternary trees and demonstrate how to reduce the number of nodes by 3, 2, or 1 node, down to the next lower value of k, while preserving total latency.

FIG. 6A illustrates exemplary ternary trees which arise from the construction of FIG. 5B, and are useful in describing aspects of the present invention. FIG. 6B illustrates removing three nodes, and FIG. 6C illustrates removing two nodes. Any desired number of nodes may be attained. Nodes are eliminated from a tree to get the proper pendancy counts. x, y, and z are random nodes to fill it out. Three leaves can be eliminated by killing off all but the floater. Two leaves may be killed off, at the cost of switching phases on one node. One leaf may be killed by killing off the permanent leaf.

As shown, the recursive construction comprises subtrees with four nodes, three of which rotate through the parent position (e.g., nodes a, b, c); the fourth node is a high-level parent or always a leaf (x, y, z). Desirably, the pendancy of x, y, or z matches that of a, b, or c as a root, as shown. The tree structure can be preserved and the tree-triples reduced by three nodes by excising a, b, and c, promoting x, y, and z up one level in the appropriate element of the triple.

To reduce by a single node, discard the permanent leaf node of the tree triple. To eliminate two nodes, discard b and c, promoting a to be the parent in all the triples. Note that this causes a to be a parent node multiple times, but it is a parent with a single child in each tree; note also that the pendancy of a changes in the second and third trees.

Thus, the number of nodes from subtrees not containing the permanent leaf node can be reduced by a multiple of 3. One, two, or three nodes may still be removed in a final reduction step. That is, FIG. 6B removes a, b, and c from low-level trees where none of a, b, and c are permanent leaves. One more leaf is removed by deleting the permanent leaf, and two more leaves are removed by applying FIG. 6C which removes b and c.

Figure 7A:
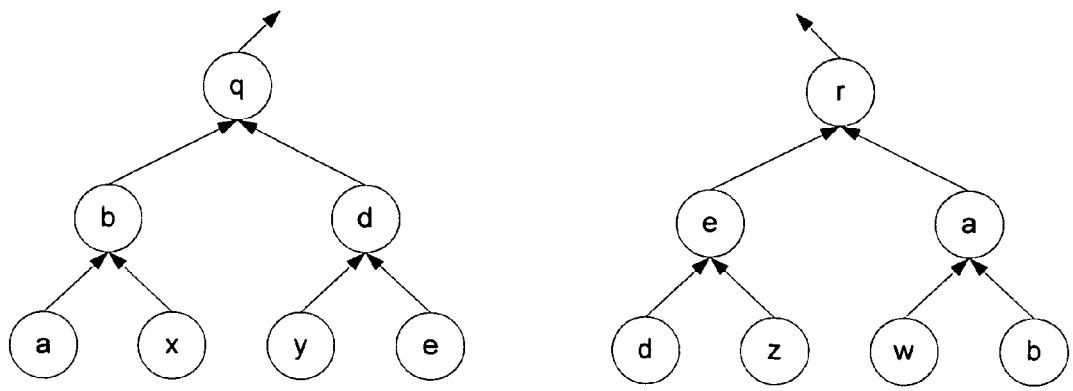
FIGS. 7A-7C illustrate exemplary trees useful in describing aspects of the present invention.
Figure 7B:
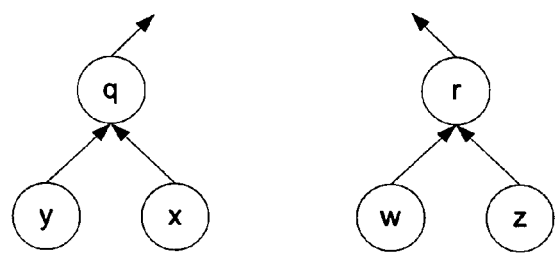
Figure 7C:
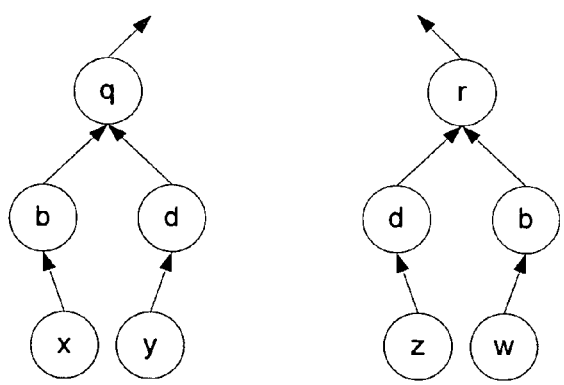

A somewhat similar construction works in the binary tree case to reduce the number of nodes by multiples of 4, and then it is shown how to eliminate 1, 2, or 3 nodes. FIGS. 7A-7C illustrate exemplary binary trees useful in describing aspects of the present invention. FIG. 7A shows the bottom three levels of a tree pair; q, r, x, y, w, and z are arbitrary. In the figures, q and r are nodes that are two levels up. FIG. 7B shows the elimination of a, b, d, and e; note that x, y, w, and z are raised a level, but maintain pendancy. FIG. 7C shows the elimination of a and e. Nodes b and e become parents in both trees, but of only one node each time, and no pendancies are disturbed. To eliminate one node, eliminate the permanent leaf. To eliminate three nodes, find the leaf grouping including the permanent leaf, eliminate two of the nodes, and observe that x and w are the permanent leaf, or y and z are. Because of pendancy, the permanent leaf is both x and w, and can be deleted from FIG. 7B.

Figure 8:
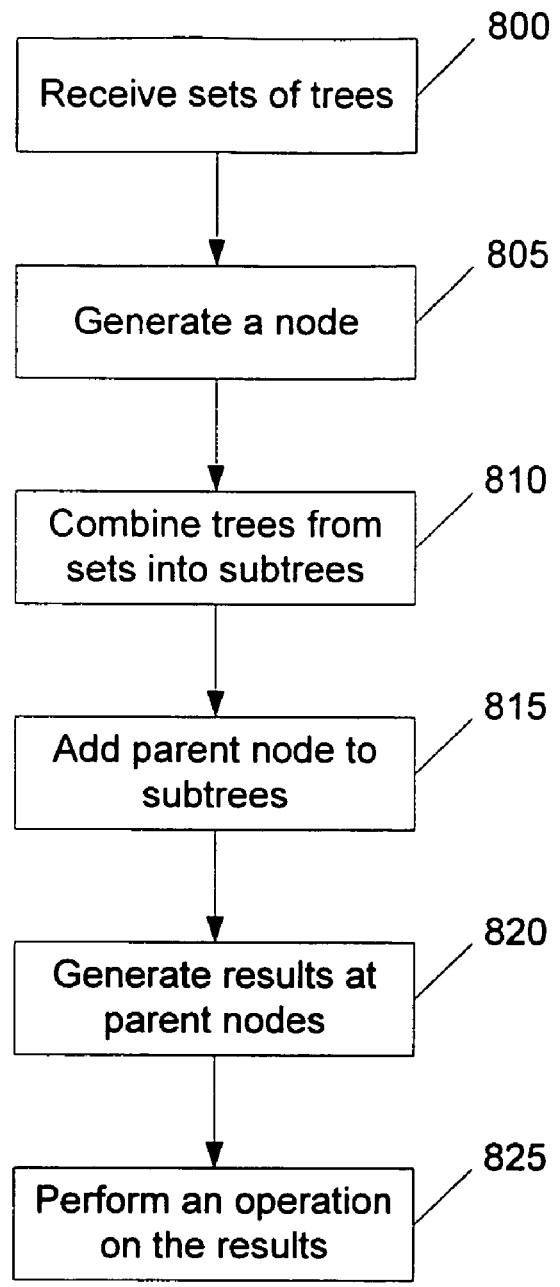
FIG. 8 is a flow diagram of an exemplary method of generating a tree structure and performing a computation in accordance with the present invention.

FIG. 8 is a flow diagram of an exemplary method of generating a tree structure and performing a computation in accordance with the present invention. At step 800, a set of trees (e.g., two pairs of trees, such as $A_0$ and $A_1$, and $B_0$ and $B_1$, of FIG. 2A, or sets of three trees, such as those in FIG. 5A) are received or generated. A node (e.g., node x in FIG. 2B) is received or generated, at step 805. The trees are then combined as described above, into subtrees, at step 810, and a parent node is added to each subtree, at step 815. The parent node may be a leaf node that has been elevated or the node that was received or generated at step 805. Further details are provided above, with respect to FIGS. 2A and 2B, for example.

The subtrees are then used to perform computations, with the results being generated at the parent nodes, at step 820. The results are then operated on, e.g., using an exclusive-or or other commutative addition operator, at step 825.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise.

Figure 9A:
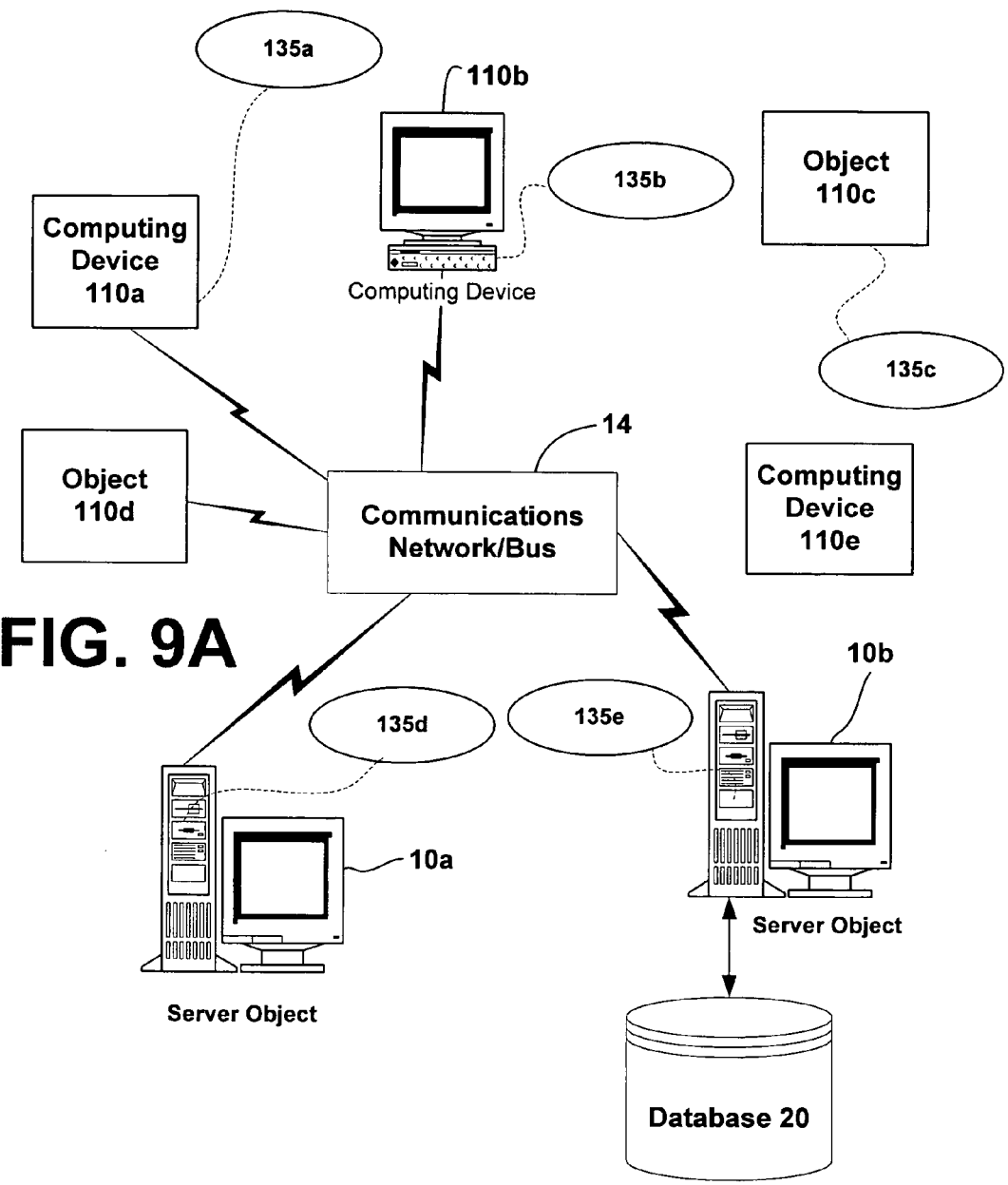
FIG. 9A is a block diagram representing an exemplary network environment having a variety of computing devices in which the present invention may be implemented.

FIG. 9A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 9A. In accordance with an aspect of the invention, each object 10a, 10b, etc. or 110a, 110b, 110c, etc. may contain an application that might make use of an API, or other object, software or hardware.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network.

It can be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9A, computers 110a, 110b, etc. can be thought of as clients and computer 10a, 10b, etc. can be thought of as the server where server 10a, 10b, etc. maintains the data that is then replicated in the client computers 110a, 110b, etc., although any computer could be considered a client, a server, or both, depending on the circumstances.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 9A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 9B:
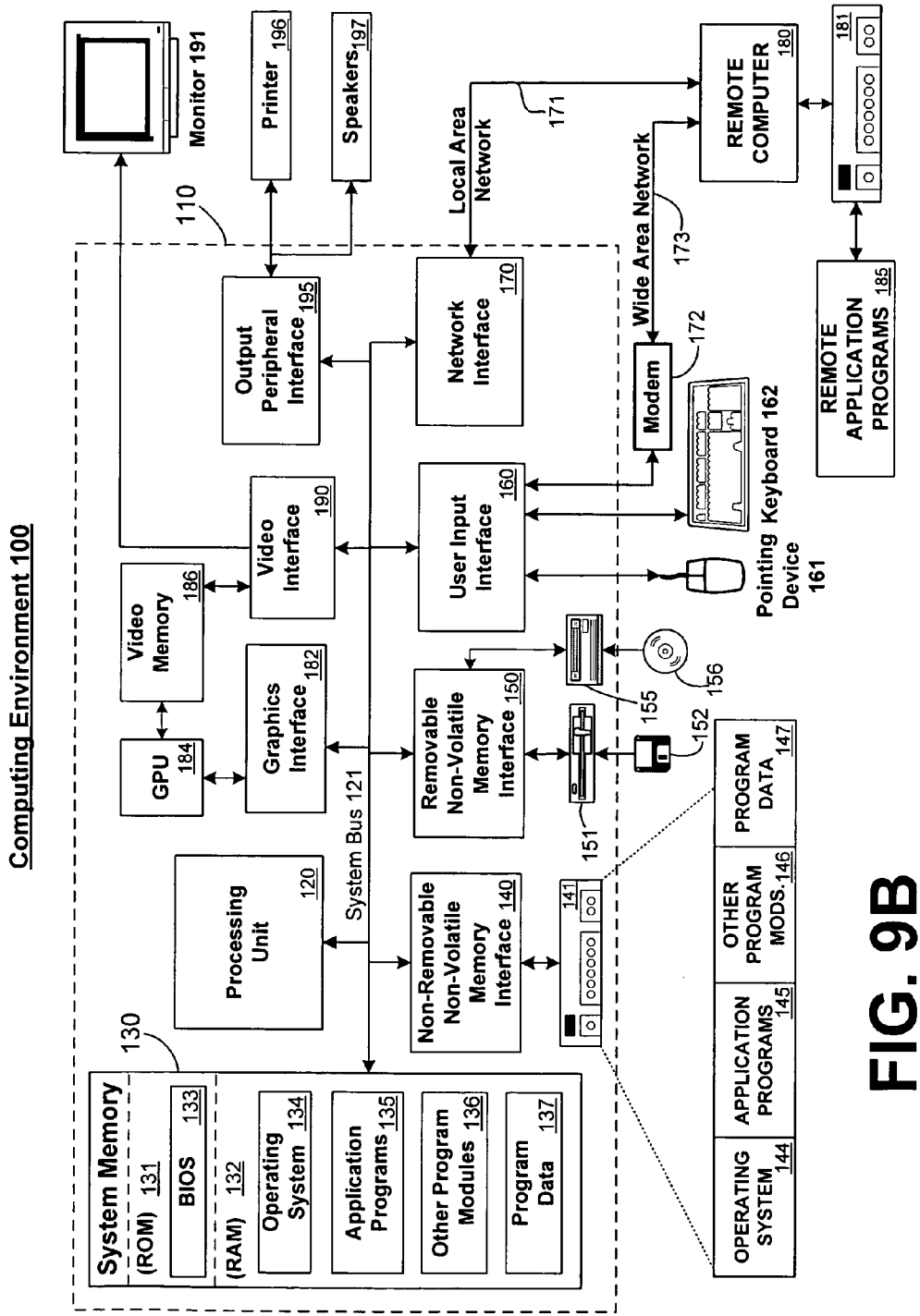
FIG. 9B is a block diagram representing an exemplary non-limiting computing device in which the present invention may be implemented.

FIG. 9B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can be implemented via an operating system, for use by a developer of services for a device or object, and/or included within application software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 9B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 9B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9B illustrates operating system 134, application programs 135, other program modules 136, and program data 137.

The computer 110 may also include other removable/non-removable, volatile/nonvolatile computer storage media. By way of example only, FIG. 9B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 9B provide storage of computer readable instructions, data structures, program modules and other data for the computer 110. In FIG. 9B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9B. The logical connections depicted in FIG. 9B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9B illustrates remote application programs 185 as residing on memory device 181. It will be appreciated that the network connections shown are exemplary and other means of establishing a communications link between the computers may be used.

There are multiple ways of implementing the present invention, e.g., an appropriate API, tool kit, driver code, operating system, standalone or downloadable software object, etc. which enables applications and services to the invention. The invention contemplates the use of the invention from the standpoint of an API (or other software object), as well as from a software or hardware object. Thus, various implementations of the invention described herein have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system. For instance, the algorithm(s) and hardware implementations of the invention may be applied to the operating system of a computing device, provided as a separate object on the device, as part of another object, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of generating a tree structure comprising processing nodes for data processing, wherein each of the processing nodes of the tree structure represents a processor unit in a processor network, the method comprising:

providing a first pair of trees including an even tree $A_0$ employed to perform even-numbered computation steps in a sequence of steps and an odd tree $A_1$ employed to perform odd-numbered computation steps in the sequence of steps, each tree of the first pair having the same leaf node a and no parent node;

providing a second pair of trees wherein each of the trees in the second pair of trees is different than each of the trees in the first pair of trees, the second pair of trees including an even tree $B_0$ employed to perform even-numbered computation steps in the sequence of steps and an odd tree $B_1$ employed to perform odd-numbered computation steps in the sequence of steps, each tree of the second pair having the same leaf node b and no parent node; and creating the tree structure comprising the processing nodes for improved concurrent processing of the sequence of steps by re-ordering the processing nodes in the first and second pairs of trees as follows:

generating a first node x for use as a parent node in the tree structure;

creating a first binary tree $X_0$ by combining the even tree $A_0$ of the first pair of trees and the odd tree $B_1$ of the second pair of trees and incorporating the first node x as a parent node of the first binary tree $X_0$; and creating a second binary tree $X_1$ by combining the odd tree $A_1$ of the first pair of trees and the even tree $B_0$ of the second pair of trees and elevating the leaf node b of the second pair of trees to become a parent node of the second binary tree $X_1$.

2. The method of claim 1, wherein each of the first binary tree $X_0$ and the second binary tree $X_1$ has a common leaf node corresponding to the leaf node a of the first pair of trees.

3. The method of claim 1, wherein the first binary tree $X_0$ has a leaf node corresponding to the leaf node b of the second pair of trees, and the second binary tree $X_0$ has a leaf node corresponding to the parent node of the first binary tree $X_0$.

4. The method of claim 1, wherein the depth of each tree is log n/log k, where k is equal to 3.

5. A method of performing computations in a network computing environment comprising a plurality of processing nodes in a tree structure, wherein each processing node represents a processor unit in the network, the method comprising:

providing a first pair of processing nodes including an even processing node employed to perform even-numbered computation steps in a sequence of steps and an odd processing node employed to perform odd-numbered computation steps in the sequence of steps;

providing a second pair of processing nodes wherein each of the processing nodes in the second pair of processing nodes is different than the first pair of processing nodes and including an even processing node employed to perform even-numbered computation steps in the sequence of steps and an odd processing node employed to perform odd-numbered computation steps in the sequence of steps;

creating a tree structure for improved concurrent processing of the sequence of steps by re-ordering the processing nodes in the first and second pairs of processing nodes as follows:

combining the even one of the first pair of processing nodes and the odd one of the second pair of processing nodes into a first binary tree, and combining the odd one of the first pair of processing nodes and the even one of the second pair of processing nodes into a second binary tree, the first and second binary trees each having a parent node, wherein the first and second binary trees are linked together by at least one common processing node to improve concurrent processing of the sequence of steps by the first and second pairs of processing nodes;

generating a first computation result at the parent node of the first binary tree;

generating a second computation result at the parent node of the second binary tree; and generating a third computation result by performing an operation on the first and second computation results.

6. The method of claim 5, wherein the operation comprises an addition operator that is commutative.

7. The method of claim 5, wherein the operation is an exclusive-or operation.

8. The method of claim 5, wherein each of the binary trees is used to perform one of an odd-numbered or an even numbered computation step.

9. The method of claim 5, wherein in the first pair of processing nodes, each processing node has the same first leaf node and no parent node, and wherein in the second pair of processing nodes, each processing node has the same second leaf node and no parent node.

10. The method of claim 9, wherein the two binary trees each have a common leaf node corresponding to the first leaf node, and further wherein the first binary tree has a leaf node corresponding to the second leaf node, and the second binary tree has a leaf node corresponding to the parent node of the first binary tree.

11. A method of generating a tree structure comprising processing nodes for data processing, wherein each of the processing nodes of the tree structure represents a processor unit in a processor network, the method comprising:

providing first, second, and third trios of trees, each trio including a first tree employed to perform first out of three computation steps in a sequence of steps, a second tree employed to perform second out of three computation steps in the sequence of steps, and a third tree employed to perform third out of three computation steps in the sequence of steps, each tree of the first trio having the same first leaf node and no parent node, each tree of the second trio having the same second leaf node and no parent node, and each tree of the third trio having the same third leaf node and no parent node; and creating the tree structure comprising the processing nodes for improved concurrent processing of the sequence of steps by re-ordering the processing nodes in the first, second and third trios of trees as follows:

combining the first tree of the first trio of trees, the second tree of the second trio of trees, and the third tree of the third trio of trees into a first ternary tree $X_0$, combining the second tree of the first trio of trees, the third tree of the second trio of trees, and the first tree of the third trio of trees into a second ternary tree $X_2$, and combining the third tree of the first trio of trees, the first tree of the second trio of trees, and the second tree of the third trio of trees into a third ternary tree $X_1$;

elevating a leaf node to a parent node in one of the first or second ternary trees $X_0$ or $X_2$, and providing the generated parent node as a leaf node to the other of the first or second ternary trees; and elevating a leaf node to a parent node in one of the second or third ternary trees $X_2$ or $X_1$, and providing the generated parent node as a leaf node to the other of the second or third ternary trees.

\* \* \* \* \*